US012701229B2

(12) United States Patent
Hsiang et al.

(10) Patent No.: US 12,701,229 B2
(45) Date of Patent: Aug. 4, 2026

(54) BLOCK PARTITIONING IMAGE AND VIDEO DATA

(71) Applicant: MEDIATEK INC., Hsinchu City (TW)

(72) Inventors: Shih-Ta Hsiang, Hsinchu City (TW); Yu-Wen Huang, Hsinchu City (TW); Tzu-Der Chuang, Hsinchu City (TW); Chun-Chia Chen, Hsinchu City (TW); Chih-Wei Hsu, Hsinchu City (TW); Ching-Yeh Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/854,732

(22) PCT Filed: Apr. 12, 2023

(86) PCT No.: PCT/CN2023/087827
§ 371 (c)(1),
(2) Date: Oct. 7, 2024

(87) PCT Pub. No.: WO2023/198110
PCT Pub. Date: Oct. 19, 2023

(65) Prior Publication Data
US 2025/0301135 A1     Sep. 25, 2025

Related U.S. Application Data

(60) Provisional application No. 63/330,338, filed on Apr. 13, 2022.

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/159* (2014.11); *H04N 19/176* (2014.11); *H04N 19/70* (2014.11)

(58) Field of Classification Search
None
See application file for complete search history.

(56) References Cited

U.S. PATENT DOCUMENTS

| | | |
|---|---|---|
| 2021/0006786 A1 | 1/2021 | Gao |
| 2021/0136399 A1 | 5/2021 | Li |
| (Continued) | | |

FOREIGN PATENT DOCUMENTS

| | | |
|---|---|---|
| WO | 2021058380 A1 | 4/2021 |
| WO | 2021236400 A1 | 11/2021 |

OTHER PUBLICATIONS

International Search Report and Written Opinion dated Jun. 14, 2023, issued in application No. PCT/CN2023/087827.

*Primary Examiner* — Nam D Pham
(74) *Attorney, Agent, or Firm* — McClure, Qualey & Rodack, LLP

(57) ABSTRACT

A video coder that performs block partitioning based on maximum multi-type tree (MTT) depths separately specified for different quadtree (QT) depth levels and for different MTT types is provided. The video coder determines a maximum MTT depth for each of a plurality of possible QT depths. The video coder may also determine a maximum binary tree (BT) depth and a maximum ternary tree (TT) depth. The video coder partitions the current block by QT partitioning into QT partitions at one or more QT depths. The video coder may partition a first QT partition by MTT partitioning into MTT partitions. The MTT partitioning can be limited by the maximum MTT depth specified for the QT depth of the first QT partition, or can be limited by (i) the maximum BT depth when the MTT partitioning uses BT partitioning and (ii) the maximum TT depth when the MTT partitioning uses TT partitioning.

14 Claims, 10 Drawing Sheets

(51) Int. Cl.
    *H04N 19/176*        (2014.01)
    *H04N 19/70*         (2014.01)

(56)             References Cited

U.S. PATENT DOCUMENTS

2021/0266579 A1    8/2021  Li
2022/0321883 A1*  10/2022  Poirier ................. H04N 19/159

* cited by examiner

SPLIT_QT

SPLIT_BT_VER     SPLIT_BT_HOR     SPLIT_TT_VER     SPLIT_TT_HOR

QT depth = 0
Max MTT = 3

QT depth = 1
Max MTT = 3

QT depth = 2
Max MTT = 2

QT depth = 3
Max MTT = 1

QT depth = 4
Max MTT = 0

300

100

110

120

130

140

145

○ QT Partition

□ MTT Partition

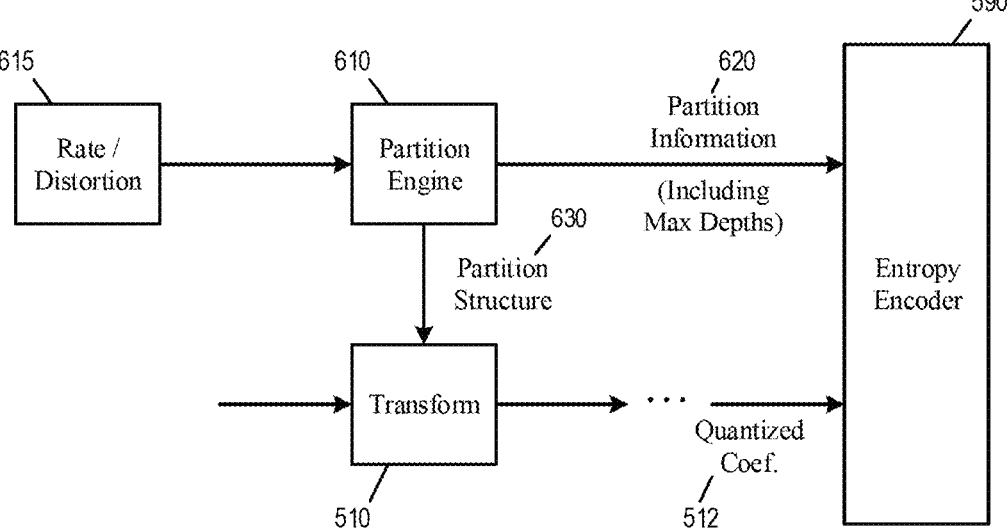
_FIG. 6_

BLOCK PARTITIONING IMAGE AND VIDEO DATA

CROSS REFERENCE TO RELATED PATENT APPLICATION(S)

The present disclosure is part of a non-provisional application that claims the priority benefit of U.S. Provisional Patent Application No. 63/330,338, filed on 13 Apr. 2022. Content of the above-listed application is herein incorporated by reference.

TECHNICAL FIELD

The present disclosure relates generally to video coding. In particular, the present disclosure relates to partitioning of pixel blocks in video pictures.

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

Versatile video coding (VVC) is the latest international video coding standard developed by the Joint Video Expert Team (JVET) of ITU-T SG16 WP3 and ISO/IEC JTC1/SC29/WG11. The input video signal is predicted from the reconstructed signal, which is derived from the coded picture regions. The prediction residual signal is processed by a block transform. The transform coefficients are quantized and entropy coded together with other side information in the bitstream. The reconstructed signal is generated from the prediction signal and the reconstructed residual signal after inverse transform on the de-quantized transform coefficients. The reconstructed signal is further processed by in-loop filtering for removing coding artifacts. The decoded pictures are stored in the frame buffer for predicting the future pictures in the input video signal.

In VVC, a coded picture is partitioned into non-overlapped square block regions represented by the associated coding tree units (CTUs). The leaf nodes of a coding tree correspond to the coding units (CUs). A coded picture can be represented by a collection of slices, each comprising an integer number of CTUs. The individual CTUs in a slice are processed in raster-scan order. A bi-predictive (B) slice may be decoded using intra prediction or inter prediction with at most two motion vectors and reference indices to predict the sample values of each block. A predictive (P) slice is decoded using intra prediction or inter prediction with at most one motion vector and reference index to predict the sample values of each block. An intra (I) slice is decoded using intra prediction only.

Each CU contains one or more prediction units (PUs). The prediction unit, together with the associated CU syntax, works as a basic unit for signaling the predictor information. The specified prediction process is employed to predict the values of the associated pixel samples inside the PU. Each CU may contain one or more transform units (TUs) for representing the prediction residual blocks. A transform unit (TU) is comprised of a transform block (TB) of luma samples and two corresponding transform blocks of chroma samples and each TB correspond to one residual block of samples from one color component. An integer transform is applied to a transform block. The level values of quantized coefficients together with other side information are entropy coded in the bitstream. The terms coding tree block (CTB), coding block (CB), prediction block (PB), and transform block (TB) are defined to specify the 2-D sample array of one color component associated with CTU, CU, PU, and TU, respectively. Thus, a CTU consists of one luma CTB, two chroma CTBs, and associated syntax elements. A similar relationship is valid for CU, PU, and TU.

In HEVC & VVC, the sequence parameter set (SPS) and the picture parameter set (PPS) contain syntax elements that apply to entire coded video sequences and pictures, respectively. The picture header (PH) and slice header (SH) contain syntax elements that apply to a current coded picture and slice, respectively.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video coder that perform block partitioning based on maximum depths separately specified for different quadtree (QT) depths and/or for different types of multi-type tree (MTT) partitioning. The video coder receives data to be encoded or decoded as a current block of pixels in a current picture of a video sequence. The video coder specifies or receives a maximum MTT depth for each of a plurality of possible QT depths. The video coder may also specify a maximum binary tree (BT) depth and a maximum ternary tree (TT) depth. The video coder partitions the current block by QT partitioning recursively into one or more QT partitions at one or more QT depths. The video coder may partition a first QT partition by MTT partitioning into MTT partitions. The MTT partitioning can be limited by the maximum MTT depth specified for the QT depth of the first QT partition, or can be limited by (i) the maximum BT depth when the MTT partitioning uses BT partitioning and (ii) the maximum TT depth when the MTT partitioning uses TT partitioning. The video coder encodes or decodes the current block by reconstructing the QT and MTT partitions of the current block.

In some embodiments, the video coder may signal a syntax element indicating whether to apply the maximum MTT depths for the plurality of possible QT depths. The video coder may signal or receive syntax elements specifying a maximum MTT depth for each of the multiple QT depths. In some embodiments, the maximum MTT depths for a luma component and maximum MTT depths for a chroma component are specified separately. In some embodiments, the video coder may also specify maximum MTT depths for binary tree (BT) partitioning and maximum MTT depths for ternary tree (TT) partitioning separately.

The syntax elements specifying the maximum MTT depths may be signaled in a picture header (PH) of the current picture, a sequence parameter set (SPS) of the video sequence, or a slice header of a current slice that includes the current block. In some embodiments, the maximum MTT depths for different QT depths are signaled in a lower-level syntax element (e.g., in a slice header or in a PH) by indicating that the maximum MTT depths are determined or derived from a higher-level syntax element (e.g., in a SPS). In some embodiments, the maximum MTT depths for different QT depths signaled in a lower-level syntax element may override MTT depths signaled in a higher-level syntax element. In some embodiments, the video coder may determine or derive the maximum MTT depth specified for a first QT depth from the maximum MTT depth specified for a second QT depth. The video coder may also signal or receive syntax elements specifying the maximum BT depth and the maximum TT depth.

For example, when the first QT partition is at a first QT level, the MTT partitioning is limited by a first maximum MTT depth, and when the first QT partition is at a second QT level, the MTT partitioning is limited by a second maximum MTT depth.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 6 illustrates portions of the video encoder that implement block partitioning constraints.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Maximum MTT Depths for Different QT Depths

Figure 1:
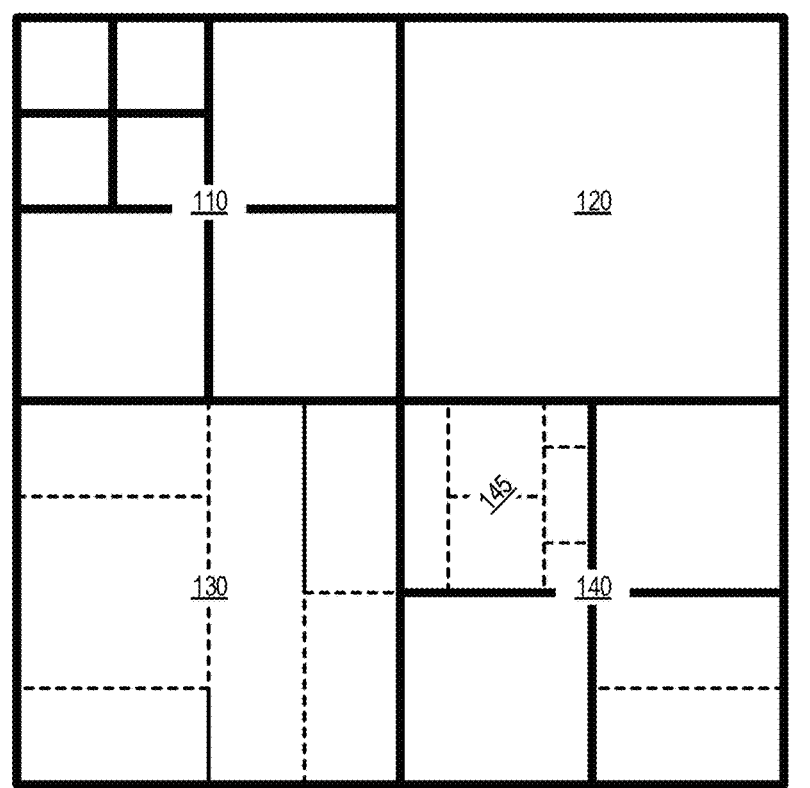
FIG. 1 provides an example coding tree unit (CTU) that is recursively partitioned by quadtree (QT) with nested multi-type tree (MTT).

A CTU can be partitioned into one or multiple non-overlapped coding units (CUs) using the quadtree (QT) with nested multi-type-tree (MTT) structure to adapt to various local motion and texture characteristics. FIG. 1 provides an example CTU 100 that is recursively partitioned by QT with nested MTT. In the figure, the bold solid edges represent quadtree partitioning and the broken edges represent multi-type tree (MTT) partitioning. As illustrated, the CTU 100 is partitioned by QT into CUs 110, 120, 130, and 140. The CU 110 is further partitioned by QT. The CU 120 is not further partitioned. The CU 130 is further partitioned by MTT. The CU 140 is further partitioned by QT and then by MTT.

Figure 2:
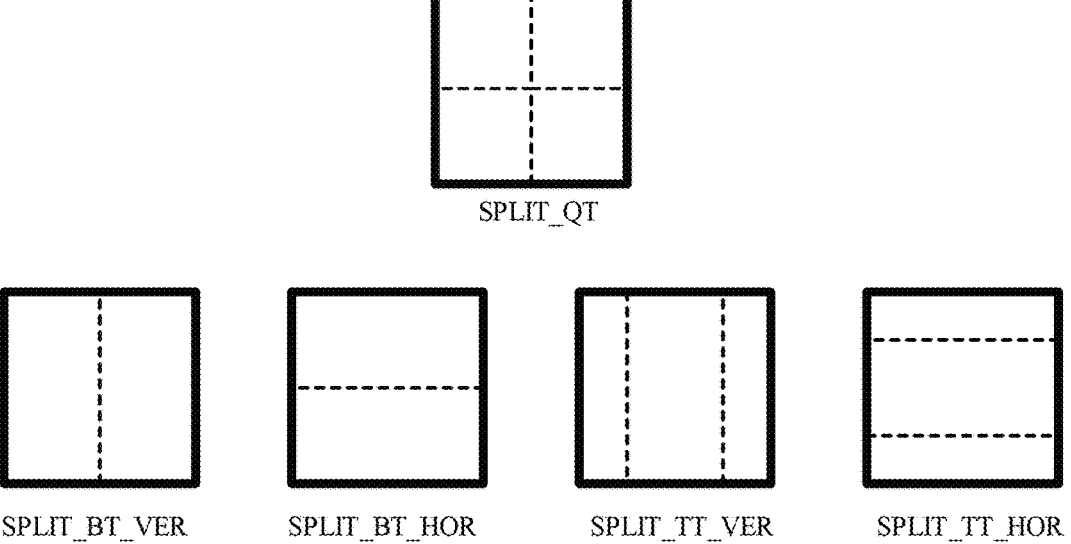
FIG. 2 illustrates the five split types of a coding unit (CU), including by QT partitioning and by MTT partitioning.

FIG. 2 illustrates the five split types of a CU, including by QT partitioning and by MTT partitioning. As illustrated, the CU can be further split into smaller CUs by using QT partitioning (SPLIT_QT), or by using one of the four MTT partitioning types: vertical binary partitioning (SPLIT_BT_VER), horizontal binary partitioning (SPLIT_BT_HOR), vertical ternary partitioning (SPLIT_TT_VER), horizontal ternary partitioning (SPLIT_TT_HOR).

The following parameters are defined for the quadtree with nested multi-type tree coding tree scheme. These parameters are specified by sequence parameter set (SPS) syntax elements and can be further refined by picture header syntax elements.

CTUsize: the root node size of a quaternary tree

MinQTSize: the minimum allowed quaternary tree leaf node size

MaxBtSize: the maximum allowed binary tree root node size

MaxTtSize: the maximum allowed ternary tree root node size.

MaxMttDepth: the maximum allowed hierarchy depth of multi-type tree splitting from a quadtree leaf MinCbSize: the minimum allowed coding block node size An intra dual tree mode can be employed for coding intra slices. When the intra dual tree mode is applied, the luma CTB is partitioned into CUs by one coding tree structure, and the two chroma CTBs are partitioned into chroma CUs by another coding tree structure. There are two coding tree syntax structures thus signaled for luma and chroma, respectively, in a CTU. As a result, each CU consists of either one coding block from the luma component or two coding blocks, respectively from the two chroma components, when the intra dual tree mode is applied.

The nested MTT structure can be applied to a quadtree leaf node to further partition a square block into one or more smaller blocks, such as the CUS 130 and 140 in the example of FIG. 1. A maximum allowed MTT depth can be signaled in the SPS to indicate the maximum allowed depth of MTT splitting from any quadtree leaf node in a video sequence and can be overridden in the PH. When the MTT depth of the current node is equal to the specified maximum allowed MTT depth, further MTT split on the current coding tree node is disallowed.

Some embodiments of the disclosure provide a method for a video coder to signal or specify maximum MTT depth adaptively based on QT depth. In some embodiments, the maximum allowed MTT depth for a current coding tree node may be adaptively controlled dependent on the quadtree depth or block size of the current coding tree node in an image or video coding system. A video coder may assign different maximum allowed MTT depths corresponding to different quadtree depths for 15 further partitioning quadtree leaves in a current picture. In this way, the MTT structure can be more flexibly controlled with respect to different block sizes.

Figure 3:
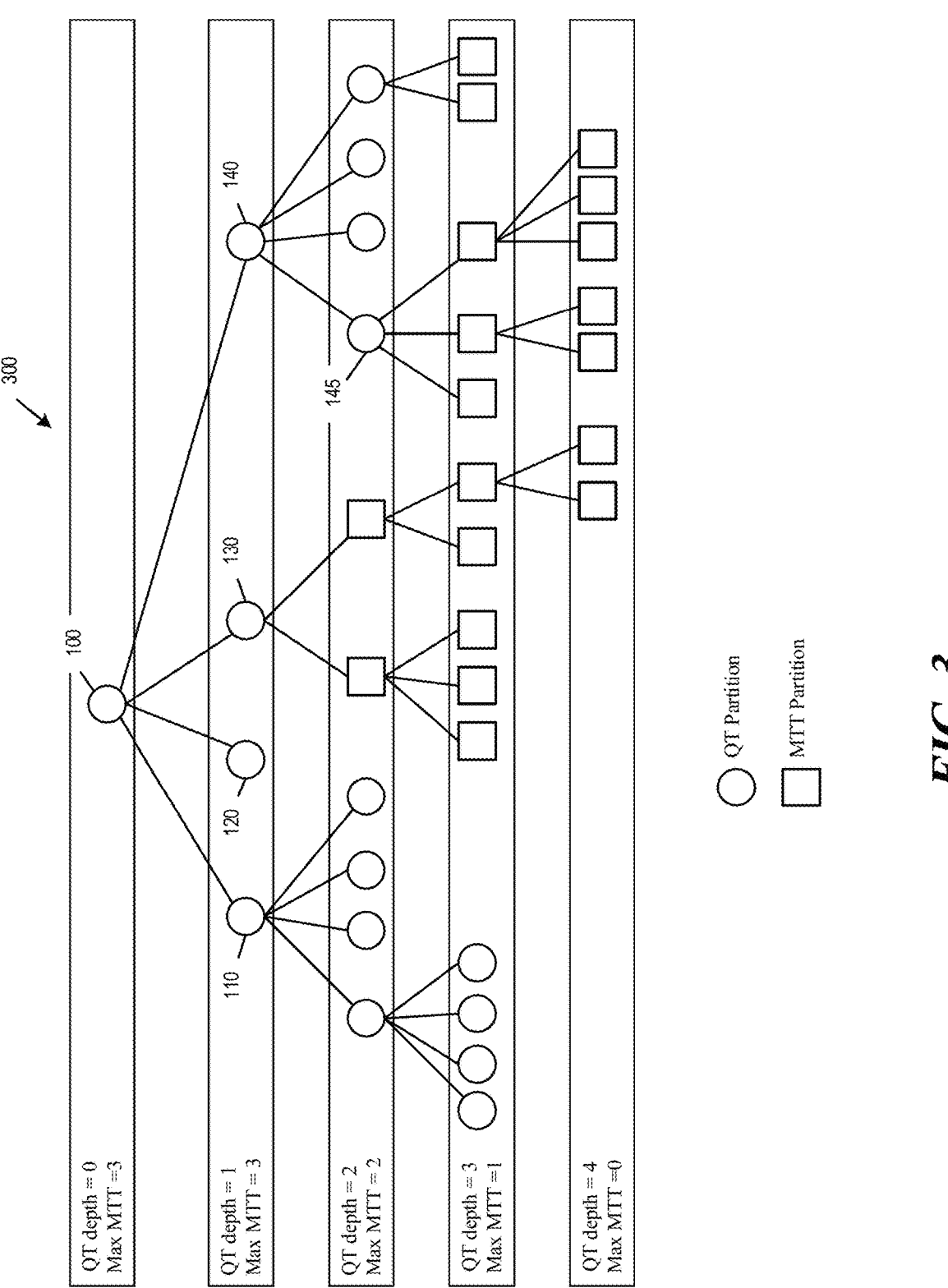
FIG. 3 conceptually illustrates assigning maximum MTT depths based on QT depths.

FIG. 3 conceptually illustrates assigning maximum MTT depths based on QT depths. The figure illustrates a partition tree 300 that correspond to the CTU 100. The partition tree 300 includes nodes that represent partitions and sub-partitions of the CTU 100 at various partitioning depths. In the figure, circular nodes represent partitions produced by QT partitioning, while square nodes represent partitions produced by MTT partitioning.

As illustrated, at each level of QT partitioning, a maximum MTT depth is specified to limit the depth of further partitioning by MTT. In the example, at QT depth=0 or 1, the maximum MTT depth is 3; at QT depth=2, the maximum MTT depth is 2; at QT depth=3, the maximum MTT depth is 1; at QT depth=4, the maximum MTT depth is 0 (no more MTT partitioning is allowed.) Thus, for example, the QT partition 130 (at QT depth=1) is limited to 3 additional levels of MTT partitioning, while the QT partition 145 (QT depth=2) is limited to 2 additional levels of MTT partitioning.

In some embodiments, the video coder may use syntax information in coded video for determining or deriving the maximum allowed MTT depth for each quad-tree depth in a or derived from the corresponding maximum allowed MTT depths associated with the higher-level syntax set referred by the current video data unit. For example, one or more syntax elements in the picture header of the current picture may indicate that the assigned maximum allowed MTT depths for different QT depths in a current picture are all derived from the corresponding maximum allowed MTT depths in the SPS referred by the current picture.

In some embodiments, the video coder may use syntax information in coded video for determining or deriving the assigned maximum allowed MTT depth for a quadtree depth based on the coded maximum MTT depth(s) for other quadtree depths. For example, a video coder may encode or decode the maximum MTT depth for quadtree depth i to be dependent on the coded maximum MTT depth for quadtree depth (i−1). In some other embodiments, the video coder may encode or decode information for determining or deriving the maximum allowed MTT depth for a current picture and signaling information for deriving the maximum allowed MTT depth for a quadtree depth dependent on the maximum allowed MTT depth for the current picture.

In some embodiments, the video coder may signal the partitioning parameters for inter and intra slices, separately. For example, when the intra dual-tree mode is enabled for coding intra slices, the maximum allowed MTT depth for each quadtree depth may be further signaled for luma and chroma components, respectively.

Tables 1-2 below are example syntax tables that include syntax elements for assigning MTT depths for different quadtree depths. In these syntax tables, different values of 'i' correspond to different QT depths. Table 1 is an example syntax table for SPS for using adaptive maximum MTT depth based on QT depth.

TABLE 1

|  | Descriptor |
|---|---|
| seq_parameter_set_rbsp( ) { |  |
|    sps_max_sublayers_minus1 | u(3) |
|    sps_chroma_format_idc | u(2) |
|    sps_log2_ctu_size_minus5 | u(2) |
|    ... |  |
|    sps_log2_min_luma_coding_block_size_minus2 | ue(v) |
|    ... |  |
|    sps_partition_constraints_override_enabled_flag | u(1) |
|    sps_log2_diff_min_qt_min_cb_inter_slice | ue(v) |
|    sps_max_mtt_hierarchy_depth_inter_slice | ue(v) |
|    if( sps_max_mtt_hierarchy_depth_inter_slice != 0 ) { |  |
|       sps_log2_diff_max_bt_min_qt_inter_slice | ue(v) |
|       sps_log2_diff_max_tt_min_qt_inter_slice | ue(v) |
|       sps_adaptive_max_mtt_hierarchy_depth_flag_inter_slice | u(1) |
|       if ( sps_adaptive_max_mtt_hierarchy_depth_flag_inter_slice ) { |  |
|         for( i = SpsLog2DiffCtbSizeYMaxMttSizeInter; i < SpsMaxQtDepth; i++ ) { |  |
|           sps_max_mtt_depth_minus_max_mtt_depth_qtd_inter_slice[i] | ue(v) |
|         } |  |
|       } |  |
|    ... |  |
| } |  | current picture. In some embodiments, the information for deriving the maximum allowed MTT depths can be coded in one or more high-level syntax sets such as the SPS, PPS, PH, and SH. The video coder may further include encoding or decoding one or more syntax elements to control whether to enable the assigning of different maximum allowed MTT depths corresponding to different quadtree depths.

In some embodiments, the video coder may encode or decode one or more syntax elements to indicate that the assigned maximum allowed MTT depths for different quadtree depths in the current video data unit are determined The SPS syntax element sps_log 2_ctu_size_minus5 plus 5 specifies the luma coding tree block size of each CTU. The variables Ctb Log 2SizeY and CtbSizeY (CTU size in luma samples) are derived as follows:

$$CtbLog2SizeY = sps\_log2\_ctu\_size\_minus5 + 5$$

$$CtbSizeY = 1 \ll CtbLog2SizeY$$

The SPS syntax element sps_log 2_min_luma_coding_block_size_minus2 plus 2 specifies the minimum luma coding block size. The variables MinCb Log 2SizeY and MinCbSizeY (minimum size of a CB in luma samples) are derived as follows:

$$MinCbLog2SizeY = sps\_log2\_min\_luma\_coding\_block\_size\_minus2 + 2$$

$$MinCbSizeY = 1 \ll MinCbLog2SizeY$$

Table 2 is an example syntax table for picture header (PH) for using adaptive maximum MTT depth:

TABLE 2

|  | Descriptor |
|---|---|
| picture_header_structure( ) { | |
|   ph_gdr_or_irap_pic_flag | u(1) |
|   ... | |
|   if( sps_partition_constraints_override_enabled_flag ) | |
|     ph_partition_constraints_override_flag | u(1) |
|   ... | |
|   if( ph_inter_slice_allowed_flag ) { | |
|     if( ph_partition_constraints_override_flag ) { | |
|       ph_log2_diff_min_qt_min_cb_inter_slice | ue(v) |
|       ph_max_mtt_hierarchy_depth_inter_slice | ue(v) |
|       if( ph_max_mtt_hierarchy_depth_inter_slice != 0 ) { | |
|         ph_log2_diff_max_bt_min_qt_inter_slice | ue(v) |
|         ph_log2_diff_max_tt_min_qt_inter_slice | ue(v) |
|       ph_adaptive_max_mtt_hierarchy_depth_flag_inter_slice | u(1) |
|       if( ph_adaptive_max_mtt_hierarchy_depth_flag_inter_slice ) { | |
|         ph_adaptive_max_mtt_depths_override_flag_inter_slice | u(1) |
|         if( ph_adaptive_max_mtt_depths_override_flag_inter_slice ) { | |
|           for( i = Log2DiffCtbSizeYMaxMttSizeInter; i < MaxQtDepth; i++ ) { | |
|             ph_max_mtt_depth_minus_max_mtt_depth_qtd_inter_slice[i] | ue(v) |
|           } | |
|         } | |
|       } | |
|     } | |
|   } | |
|   ... | |
| } | |

The PH syntax element ph_log 2_diff_min_qt_min_cb_inter_slice specifies the difference between the base 2 logarithm of the minimum size in luma samples of a luma leaf block resulting from quadtree splitting of a CTU and the base 2 logarithm of the minimum coding block size in luma samples for luma CUs for inter slices in an current picture.

The PH syntax element ph_log 2_diff_max_bt_min_qt_inter_slice specifies the difference between the base 2 logarithm of the maximum size (width or height) in luma samples of a luma coding block that can be split using a binary split and the base 2 logarithm of the minimum size (width or height) in luma samples of a luma leaf block resulting from quadtree splitting of a CTU for inter slices in an current picture.

The variable MinQtSizeY indicates the minimum size in luma samples of a luma leaf block resulting from quadtree splitting of a CTU for inter slices in an current picture and is derived as follows:

$$MinQtLog2SizeY =$$
$$MinCbLog2SizeY + ph\_log2\_diff\_min\_qt\_min\_cb\_inter\_slice$$

$$MinQtSizeY = 1 \ll MinQtLog2SizeY$$

The variable MaxBtSizeY indicates the maximum size in luma samples of a luma coding block that can be split using a binary split for inter slices in an current picture and is derived as follows:

$$MaxBtLog2SizeY =$$
$$MinQtLog2SizeY + ph\_log2\_diff\_max\_bt\_min\_qt\_inter\_slice$$

$$MaxBtSizeY = 1 \ll MaxBtLog2SizeY$$

The variable MaxTtSizeY indicates the maximum size in luma samples of a luma coding block that can be split using a ternary split for inter slices in an current picture and is derived as follows:

$$MaxTtLog2SizeY =$$
$$MinQtLog2SizeY + ph\_log2\_diff\_max\_tt\_min\_qt\_inter\_slice$$

$$MaxTtSizeY = 1 \ll MaxTtLog2SizeY$$

The variable MaxQtDepth indicates the maximum allowed quadtree depth for inter slices in a current picture, derived as follows:

$$MaxQtDepth = CtbLog2SizeY - MinQtLog2SizeY$$

The variable MaxMtt Log 2SizeY indicating the base 2 logarithm of the maximum size in luma samples of a luma coding block that can be split using a MTT split for inter slices in a current picture, derived as follows:

$$MaxMtt\ Log\ 2SizeY = Max(MaxBtLog\ 2SizeY, MaxTt\ Log\ 2SizeY)$$

In some embodiments, the maximum allowed MTT depth for each quad-tree depth in a current picture can be flexibly assigned in a coded picture. The variable MaxMttDepthInter [i] indicates the maximum allowed depth for MTT split corresponding to quadtree depth i for inter slices in a current picture. When the MTT depth of a current coding tree node corresponding to quadtree depth i is equal to MaxMtt-DepthInter[i], the current coding tree node can not be further split by any MTT split. When ph_adaptive_max_mtt_hierarchy_depth_flag_inter_slice is equal to 0, the maximum MTT depth is not adaptive with respect to the quadtree depth and MaxMttDepthInter[i] is set equal to ph_max_mtt_hierarchy_depth_inter_slice for each quadtree depth i. Otherwise, when ph_adaptive_max_mtt_depths_override_flag_inter_slice is equal to 0, MaxMttDepthInter[i] is set equal to the corresponding default parameter value specified in the SPS referred by the current picture. Otherwise, MaxMttDepthInter[i] is derived as follows:

$$\text{Log2DiffCtbSizeYMaxMttSizeInter} = \text{CtbLog2SizeY} - \text{MaxMttLog2SizeY}$$

$$\text{MaxMttDepthInter}[i] = i < \text{Log2DiffCtbSizeYMaxMttSizeInter} ? 0 :$$

$$(\text{ph\_max\_mtt\_hierarchy\_depth\_inter\_slice} - \text{ph\_max\_mtt\_depth\_minus\_max\_mtt\_depth\_qtd\_inter\_slice}[i]).$$

A similar syntax structure is coded in a SPS for indicating the default partitioning parameter set for the coded pictures referring to the SPS. Similar to the derivation of Log 2DiffCtb Size YMaxMttSizeInter and MaxQtDepth, the variables Sps Log 2DiffCtbSizeYMaxMttSizeInter and Sps-MaxQtDepth in the SPS can be derived from the corresponding syntax elements in the SPS. When ph_partition_constraints_override_flag is equal to 0 in a current picture, the partitioning parameter set in the current picture is set equal to the default partitioning set specified in the SPS referred by the current picture. Similar modifications can be applied to the related partitioning parameters for intra slices.

II. Separate Maximum MTT Depths for BT and TT

In some embodiments, the max allowed MTT depth for TT and the max allowed MTT depth for BT may be separately controlled in an image or video coding system. A video coder may assign different maximum allowed MTT depths for BT and TT in a coded picture. When the MTT depth of a current node is equal to the specified max allowed MTT depth for TT, the further TT split on the current coding tree node is disallowed. Similarly, when the MTT depth of a current node is equal to the specified max allowed MTT depth for BT, the further BT split on the current coding tree node is disallowed. In this way, the MTT structure can be more flexibly controlled for different MTT split types.

Figure 4:
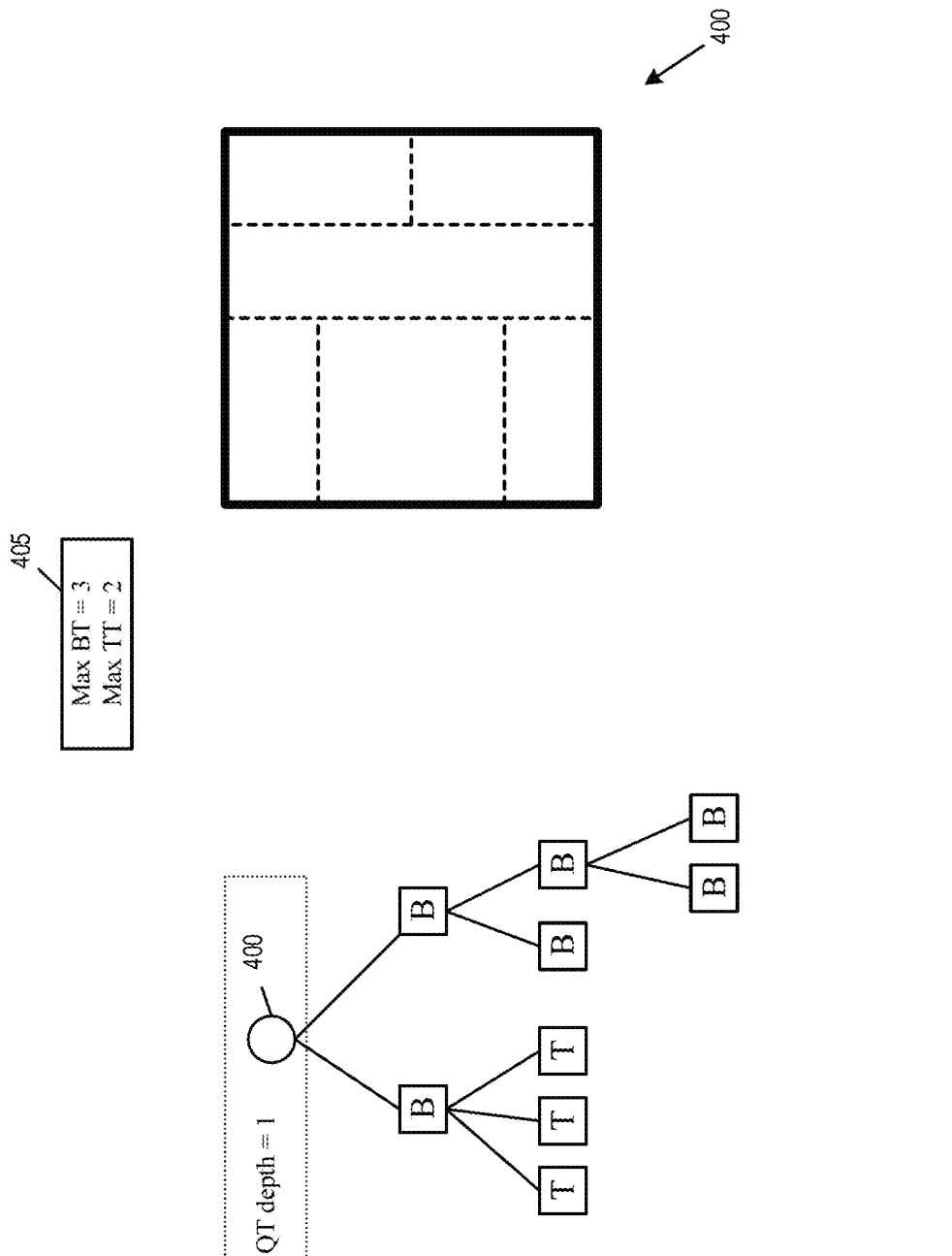
FIG. 4 conceptually illustrates separately controlled maximum MTT depths for binary tree (BT) and ternary tree (TT).

FIG. 4 conceptually illustrates separately controlled maximum MTT depths for BT and TT. As illustrated, a set of coded syntax information 405 in the coded video specifies the maximum MTT depth for BT and the maximum MTT depth for TT separately: the maximum MTT depth is 3 for BT, and the maximum MTT depth for TT is 2. The coded information 405 refers to information encoded as syntax elements in a coded video.

The coded information 405 is applicable to a CU 400, which is partitioned by MTT. The maximum MTT partitioning depth of the CU 400 is 3 for BT, while the maximum MTT partitioning depth of the CTU is 2 for TT. In some embodiments, the coded information 405 (including the separately specified maximum MTT depths for BT and TT) is applicable to an entire sequence, or a picture, or a slice (inter or intra), or a CTU, or a CU. In some embodiments, the coded information 405 can be specified for a particular QT depth.

As mentioned, in some embodiments, the video coder may use coded syntax information for determining or deriving the maximum allowed MTT depth for BT and the maximum allowed MTT depth for TT. In some specific embodiments, the information for determining deriving the maximum allowed MTT depths for BT and TT can be coded in one or more high-level syntax sets such as the SPS, PPS, PH, and SH. The video coder may also use one or more coded syntax elements to control whether to enable assigning different maximum allowed MTT depths for BT and TT, respectively. The video coder may further constrain the maximum allowed MTT depth for TT to be less than or equal to the maximum allowed MTT depth for BT.

Table 3 below is an example syntax table for the SPS that provide separate controls for maximum BT and TT depths.

TABLE 3

|  | Descriptor |
| --- | --- |
| seq_parameter_set_rbsp( ) { |  |
| sps_max_sublayers_minus1 | u(3) |
| sps_chroma_format_idc | u(2) |
| sps_log2_ctu_size_minus5 | u(2) |
| ... |  |
| sps_log2_min_luma_coding_block_size_minus2 | ue(v) |
| ... |  |
| sps_partition_constraints_override_enabled_flag | u(1) |
| sps_log2_diff_min_qt_min_cb_inter_slice | ue(v) |
| sps_max_mtt_hierarchy_depth_inter_slice | ue(v) |
| if( sps_max_mtt_hierarchy_depth_inter_slice != 0 ) { |  |
| sps_max_bt_hierarchy_depth_inter_slice | ue(v) |
| if( sps_max_bt_hierarchy_depth_inter_slice != 0 ) |  |
| sps_log2_diff_max_bt_min_qt_inter_slice | ue(v) |
| sps_max_tt_hierarchy_depth_inter_slice | ue(v) |
| if( sps_max_tt_hierarchy_depth_inter_slice != 0 ) |  |
| sps_log2_diff_max_tt_min_qt_inter_slice | ue(v) |
| } |  |
| ... |  |
| } |  |

Table 4 below is an example syntax table for PH that provide separate controls for maximum BT and TT depths:

TABLE 4

|  | Descriptor |
| --- | --- |
| picture_header_structure( ) { |  |
| ph_gdr_or_irap_pic_flag | u(1) |
| ... |  |
| if( sps_partition_constraints_override_enabled_flag ) |  |
| ph_partition_constraints_override_flag | u(1) |
| ... |  |
| if( ph_inter_slice_allowed_flag ) { |  |
| if( ph_partition_constraints_override_flag ) { |  |
| ph_log2_diff_min_qt_min_cb_inter_slice | ue(v) |
| ph_max_mtt_hierarchy_depth_inter_slice | ue(v) |
| if( ph_max_mtt_hierarchy_depth_inter_slice != 0 ) { |  |
| ph_max_bt_hierarchy_depth_inter_slice | ue(v) |
| if( ph_max_bt_hierarchy_depth_inter_slice != 0 ) |  |
| ph_log2_diff_max_bt_min_qt_inter_slice | ue(v) |
| ph_max_tt_hierarchy_depth_inter_slice | ue(v) |
| if( ph_max_tt_hierarchy_depth_inter_slice != 0 ) |  |
| ph_log2_diff_max_tt_min_qt_inter_slice | ue(v) |
| } |  |
| ... |  |
| } |  |

In Tables 3 and 4, the maximum allowed MTT depths are signaled for BT and TT separately for an inter slice. Similar modifications can be applied to the related partitioning parameters for intra slices. In some embodiments, the video coder may signal the partitioning parameters for inter and intra slices, separately. When the intra dual-tree mode is enabled for coding intra slices, the maximum allowed MTT depths for BT and TT may be separately signaled for luma and chroma components in an intra slice.

In some embodiments, the video coder may use coded syntax information for determining or deriving the maximum allowed MTT depth BT and TT, respectively, for each quad-tree depth. The above-mentioned methods for encoding or decoding the maximum allowed MTT depths for different quadtree depths may be similarly applied to encoding or decoding the maximum allowed MTT depths for different quadtree depths for BT and TT.

Any of the foregoing proposed methods can be implemented in encoders and/or decoders. For example, any of the proposed methods can be implemented in a coefficient coding module of an encoder, and/or a coefficient coding module of a decoder. Alternatively, any of the proposed methods can be implemented as a circuit integrated to the coefficient coding module of the encoder and/or the coefficient coding module of the decoder. The proposed aspects, methods and related embodiments can be implemented individually and jointly in an image and video coding system.

III. Example Video Encoder

Figure 5:
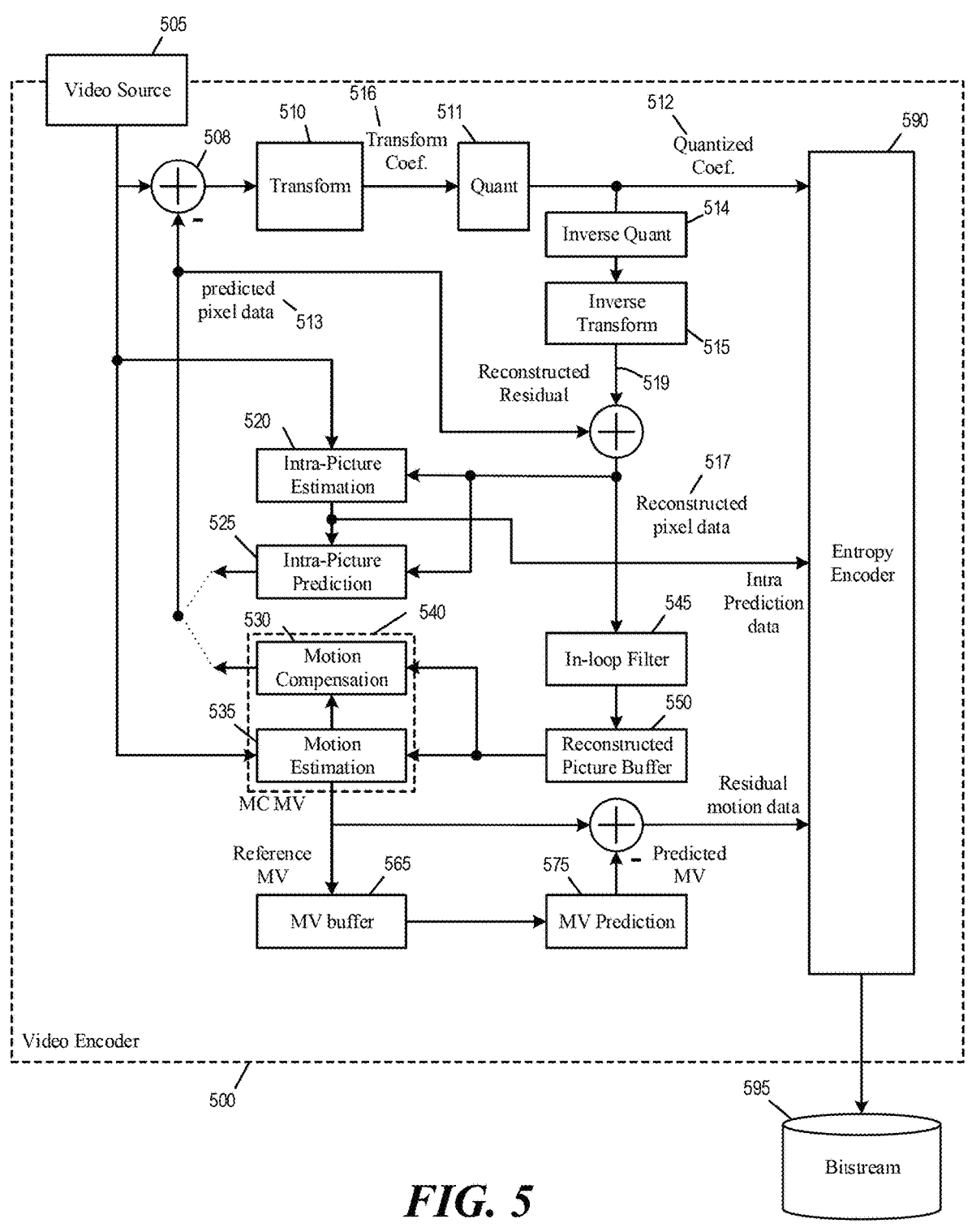
FIG. 5 illustrates an example video encoder that may implement block partitioning.

FIG. 5 illustrates an example video encoder 500 that may implement block partitioning. As illustrated, the video encoder 500 receives input video signal from a video source 505 and encodes the signal into bitstream 595. The video encoder 500 has several components or modules for encoding the signal from the video source 505, at least including some components selected from a transform module 510, a quantization module 511, an inverse quantization module 514, an inverse transform module 515, an intra-picture estimation module 520, an intra-prediction module 525, a motion compensation module 530, a motion estimation module 535, an in-loop filter 545, a reconstructed picture buffer 550, a MV buffer 565, and a MV prediction module 575, and an entropy encoder 590. The motion compensation module 530 and the motion estimation module 535 are part of an inter-prediction module 540.

In some embodiments, the modules 510-590 are modules of software instructions being executed by one or more processing units (e.g., a processor) of a computing device or electronic apparatus. In some embodiments, the modules 510-590 are modules of hardware circuits implemented by one or more integrated circuits (ICs) of an electronic apparatus. Though the modules 510-590 are illustrated as being separate modules, some of the modules can be combined into a single module.

The video source 505 provides a raw video signal that presents pixel data of each video frame without compression. A subtractor 508 computes the difference between the raw video pixel data of the video source 505 and the predicted pixel data 513 from the motion compensation module 530 or intra-prediction module 525. The transform module 510 converts the difference (or the residual pixel data or residual signal 508) into transform coefficients (e.g., by performing Discrete Cosine Transform, or DCT). The quantization module 511 quantizes the transform coefficients into quantized data (or quantized coefficients) 512, which is encoded into the bitstream 595 by the entropy encoder 590.

The inverse quantization module 514 de-quantizes the quantized data (or quantized coefficients) 512 to obtain transform coefficients, and the inverse transform module 515 performs inverse transform on the transform coefficients to produce reconstructed residual 519. The reconstructed residual 519 is added with the predicted pixel data 513 to produce reconstructed pixel data 517. In some embodiments, the reconstructed pixel data 517 is temporarily stored in a line buffer (not illustrated) for intra-picture prediction and spatial MV prediction. The reconstructed pixels are filtered by the in-loop filter 545 and stored in the reconstructed picture buffer 550. In some embodiments, the reconstructed picture buffer 550 is a storage external to the video encoder 500. In some embodiments, the reconstructed picture buffer 550 is a storage internal to the video encoder 500.

The intra-picture estimation module 520 performs intra-prediction based on the reconstructed pixel data 517 to produce intra prediction data. The intra-prediction data is provided to the entropy encoder 590 to be encoded into bitstream 595. The intra-prediction data is also used by the intra-prediction module 525 to produce the predicted pixel data 513.

The motion estimation module 535 performs inter-prediction by producing MVs to reference pixel data of previously decoded frames stored in the reconstructed picture buffer 550. These MVs are provided to the motion compensation module 530 to produce predicted pixel data.

Instead of encoding the complete actual MVs in the bitstream, the video encoder 500 uses MV prediction to generate predicted MVs, and the difference between the MVs used for motion compensation and the predicted MVs is encoded as residual motion data and stored in the bitstream 595.

The MV prediction module 575 generates the predicted MVs based on reference MVs that were generated for encoding previously video frames, i.e., the motion compensation MVs that were used to perform motion compensation. The MV prediction module 575 retrieves reference MVs from previous video frames from the MV buffer 565. The video encoder 500 stores the MVs generated for the current video frame in the MV buffer 565 as reference MVs for generating predicted MVs.

The MV prediction module 575 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 595 by the entropy encoder 590.

The entropy encoder 590 encodes various parameters and data into the bitstream 595 by using entropy-coding techniques such as context-adaptive binary arithmetic coding (CABAC) or Huffman encoding. The entropy encoder 590 encodes various header elements, flags, along with the quantized transform coefficients 512, and the residual motion data as syntax elements into the bitstream 595. The bitstream 595 is in turn stored in a storage device or transmitted to a decoder over a communications medium such as a network.

The in-loop filter 545 performs filtering or smoothing operations on the reconstructed pixel data 517 to reduce the artifacts of coding, particularly at boundaries of pixel blocks. In some embodiments, the filtering operation performed includes sample adaptive offset (SAO). In some embodiment, the filtering operations include adaptive loop filter (ALF).

FIG. 6 illustrates portions of the video encoder 500 that implement block partitioning constraints. Specifically, a partition engine 610 generates a set of partitioning information 620 for the entropy encoder 590 based on rate/distortion information 615. The entropy encoder 590 encodes or signals the set of partitioning information 620 as syntax elements into the bitstream 595 (e.g., according to syntax tables described by reference to Tables 1-4 above). The partitioning constraints 620 may include constraints that are applicable at different levels of video hierarchy (e.g., sequence, picture, slice, block) and be signaled in slice headers, picture headers, SPS, etc., by the entropy encoder 590. The partition information 620 may include constraints such as maximum MTT depths at different QT levels, maximum BT depths, maximum TT depths, etc. The partition engine 610 also provide partitioning structure 630 to the transform module 510 so the transform module may perform transform operations on a current block of pixels being coded according to the partitioning structure 630 to produce quantized coefficients 512.

Figure 7:
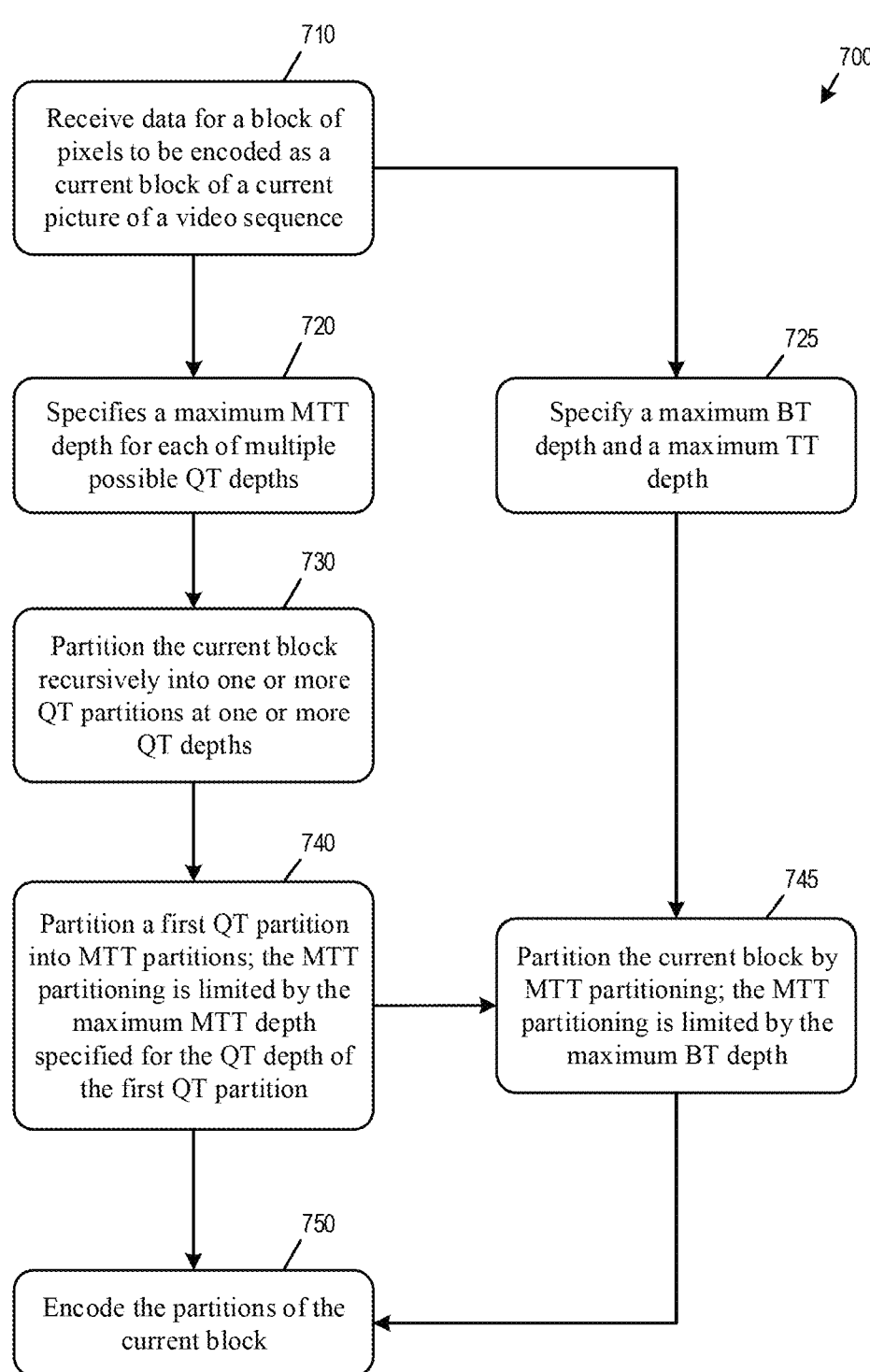
FIG. 7 conceptually illustrates a process for block partitioning based on maximum depths separately specified for different types of MTT partitioning and for different depth levels of QT partitioning.

FIG. 7 conceptually illustrates a process 700 for block partitioning based on maximum depths separately specified for different types of MTT partitioning and for different depth levels of QT partitioning. In some embodiments, one or more processing units (e.g., a processor) of a computing device implementing the encoder 500 performs the process 700 by executing instructions stored in a computer readable medium. In some embodiments, an electronic apparatus implementing the encoder 500 performs the process 700.

The encoder receives (at block 710) data to be encoded as a current block of pixels in a current picture of a video sequence. The encoder specifies (at block 720) a maximum multi-type tree (MTT) depth for each of a plurality of possible QT depths. The encoder may signal a syntax element indicating whether to apply the maximum MTT depths for the plurality of possible QT depths. The encoder may signal syntax elements specifying a maximum MTT depth for each of the multiple QT depths. In some embodiments, the maximum MTT depths for a luma component and maximum MTT depths for a chroma component are specified separately. In some embodiments, the encoder may also specify maximum MTT depths for binary tree (BT) partitioning and maximum MTT depths for ternary tree (TT) partitioning separately.

The syntax elements specifying the maximum MTT depths may be signaled in a picture header (PH) of the current picture, a sequence parameter set (SPS) of the video sequence, or a slice header of a current slice that includes the current block. In some embodiments, the maximum MTT depths for different QT depths are signaled in a lower-level syntax element (e.g., in a slice header or in a PH) by indicating that the maximum MTT depths are determined or derived from a higher-level syntax element (e.g., in a SPS). In some embodiments, the maximum MTT depths for different QT depths signaled in a lower-level syntax element may override MTT depths signaled in a higher-level syntax element. In some embodiments, the encoder may determine or derive the maximum MTT depth specified for a first QT depth from the maximum MTT depth specified for a second QT depth. The syntax elements related to signaling of the maximum MTT depths for different QT depths are also described by reference to Tables 1-2 above.

The encoder may also specify (at block 725) a maximum binary tree (BT) depth and a maximum ternary tree (TT) depth. The encoder may signal syntax elements specifying the maximum BT depth and the maximum TT depth. The syntax elements related to signaling of the maximum BT and TT depths are also described by reference to Tables 3-4 above.

The encoder partitions (at block 730) the current block recursively by quadtree (QT) partitioning into one or more QT partitions at one or more QT depths. The encoder may partition (at block 740) a first QT partition by MTT partitioning into MTT partitions, the MTT partitioning being limited by the maximum MTT depth specified for the QT depth of the first QT partition. For example, when the first QT partition is at a first QT level, the MTT partitioning is limited by a first maximum MTT depth, and when the first QT partition is at a second QT level, the MTT partitioning is limited by a second maximum MTT depth.

The encoder may partition (at block 745) the current block (or a partition thereof) by MTT partitioning, the MTT partitioning being limited by (i) the maximum BT depth when the MTT partitioning uses BT partitioning and (ii) the maximum TT depth when the MTT partitioning uses TT partitioning.

The encoder encodes (at block 750) the current block by reconstructing the QT and MTT partitions of the current block to produce the prediction residuals of the current block.

IV. Example Video Decoder

In some embodiments, an encoder may signal (or generate) one or more syntax element in a bitstream, such that a decoder may parse said one or more syntax element from the bitstream.

Figure 8:
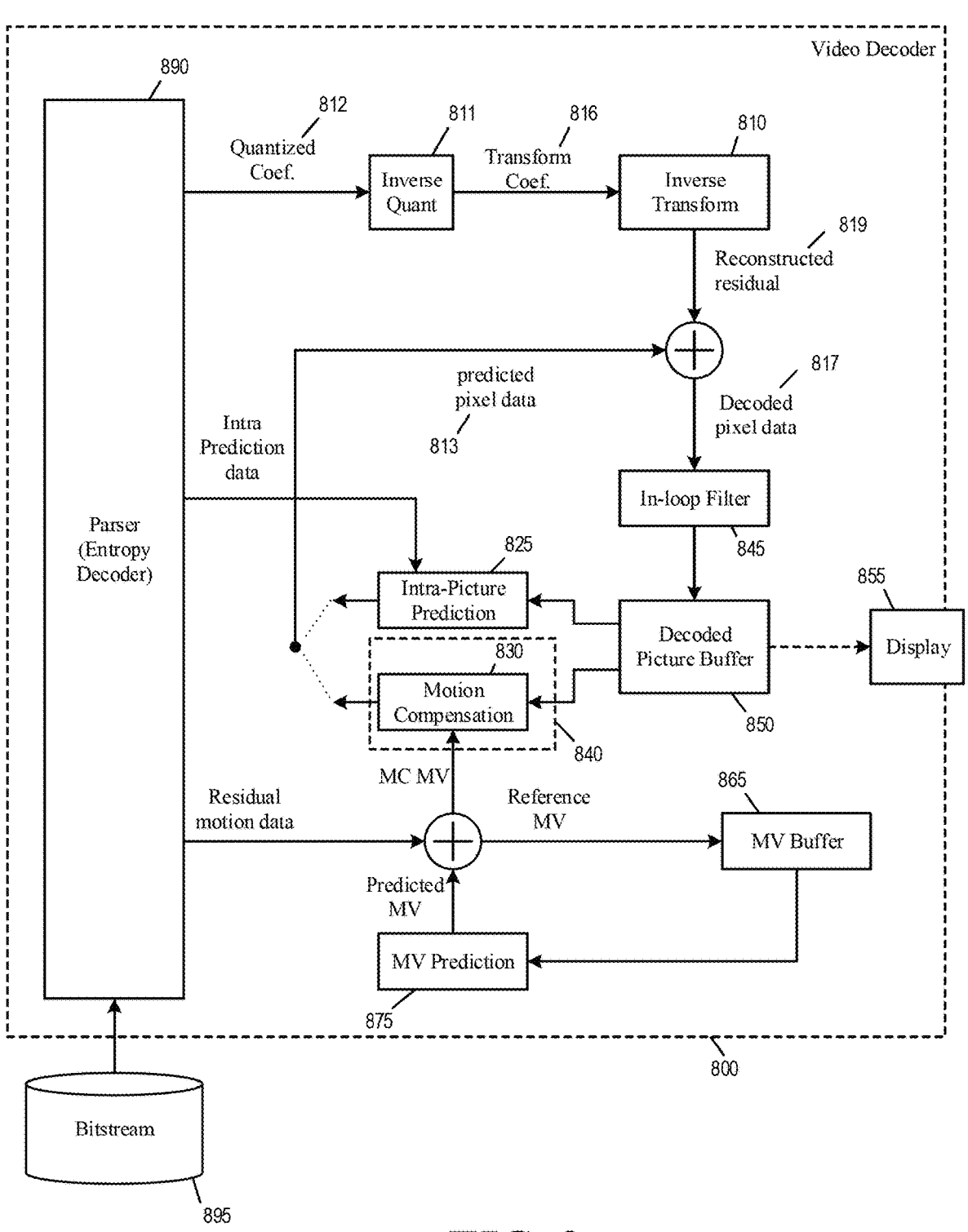
FIG. 8 illustrates an example video decoder that may implement block partitioning.

FIG. 8 illustrates an example video decoder 800 that may implement block partitioning. As illustrated, the video decoder 800 is an image-decoding or video-decoding circuit that receives a bitstream 895 and decodes the content of the bitstream into pixel data of video frames for display. The video decoder 800 has several components or modules for decoding the bitstream 895, including some components selected from an inverse quantization module 811, an inverse transform module 810, an intra-prediction module 825, a motion compensation module 830, an in-loop filter 845, a decoded picture buffer 850, a MV buffer 865, a MV prediction module 875, and a parser 890. The motion compensation module 830 is part of an inter-prediction module 840.

In some embodiments, the modules 810-890 are modules of software instructions being executed by one or more processing units (e.g., a processor) of a computing device. In some embodiments, the modules 810-890 are modules of hardware circuits implemented by one or more ICs of an electronic apparatus. Though the modules 810-890 are illustrated as being separate modules, some of the modules can be combined into a single module.

The parser 890 (or entropy decoder) receives the bitstream 895 and performs initial parsing according to the syntax defined by a video-coding or image-coding standard. The parsed syntax element includes various header elements, flags, as well as quantized data (or quantized coefficients) 812. The parser 890 parses out the various syntax elements by using entropy-coding techniques such as context-adaptive binary arithmetic coding (CABAC) or Huffman encoding.

The inverse quantization module 811 de-quantizes the quantized data (or quantized coefficients) 812 to obtain transform coefficients, and the inverse transform module 810 performs inverse transform on the transform coefficients 816 to produce reconstructed residual signal 819. The reconstructed residual signal 819 is added with predicted pixel data 813 from the intra-prediction module 825 or the motion compensation module 830 to produce decoded pixel data 817. The decoded pixels data are filtered by the in-loop filter 845 and stored in the decoded picture buffer 850. In some embodiments, the decoded picture buffer 850 is a storage external to the video decoder 800. In some embodiments, the decoded picture buffer 850 is a storage internal to the video decoder 800.

The intra-prediction module 825 receives intra-prediction data from bitstream 895 and according to which, produces the predicted pixel data 813 from the decoded pixel data 817 stored in the decoded picture buffer 850. In some embodiments, the decoded pixel data 817 is also stored in a line buffer (not illustrated) for intra-picture prediction and spatial MV prediction.

In some embodiments, the content of the decoded picture buffer 850 is used for display. A display device 855 either retrieves the content of the decoded picture buffer 850 for display directly, or retrieves the content of the decoded picture buffer to a display buffer. In some embodiments, the display device receives pixel values from the decoded picture buffer 850 through a pixel transport.

The motion compensation module 830 produces predicted pixel data 813 from the decoded pixel data 817 stored in the decoded picture buffer 850 according to motion compensation MVs (MC MVs). These motion compensation MVs are decoded by adding the residual motion data received from the bitstream 895 with predicted MVs received from the MV prediction module 875.

The MV prediction module 875 generates the predicted MVs based on reference MVs that were generated for decoding previous video frames, e.g., the motion compensation MVs that were used to perform motion compensation. The MV prediction module 875 retrieves the reference MVs of previous video frames from the MV buffer 865. The video decoder 800 stores the motion compensation MVs generated for decoding the current video frame in the MV buffer 865 as reference MVs for producing predicted MVs.

The in-loop filter 845 performs filtering or smoothing operations on the decoded pixel data 817 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 9:
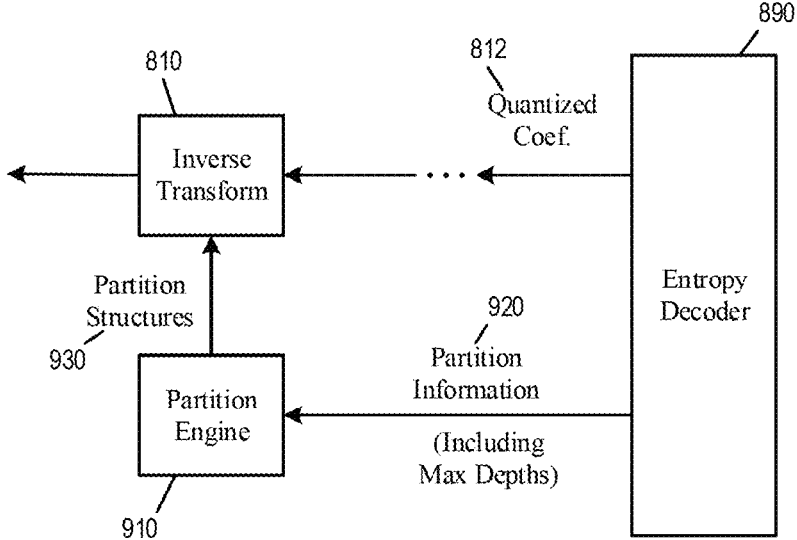
FIG. 9 illustrates portions of the video decoder that implement block partitioning constraints.

FIG. 9 illustrates portions of the video decoder 800 that implement block partitioning constraints. Specifically, the entropy decoder 890 parses from the bitstream 895 syntax elements that are related to block partitioning and generates a set of partitioning information 920. The partitioning constraints may include partitioning constraints that are applicable at different levels of video hierarchy (e.g., sequence, picture, slice, block) and be signaled in slice headers, picture headers, SPS, etc. The partition information 920 may include constraints such as maximum MTT depths at different QT levels, maximum BT depths, maximum TT depths, etc. The generated partitioning information 920 are applied to a partitioning engine 910, which may disallow certain split modes beyond certain partitioning depth levels based on the constraints. The partition engine 910 in turn generates partitioning structures 930 for the inverse transform module 810 so it can perform inverse transform operations on quantized coefficients 812 of individual partitions (e.g., CUs) according to the partitioning structure.

Figure 10:
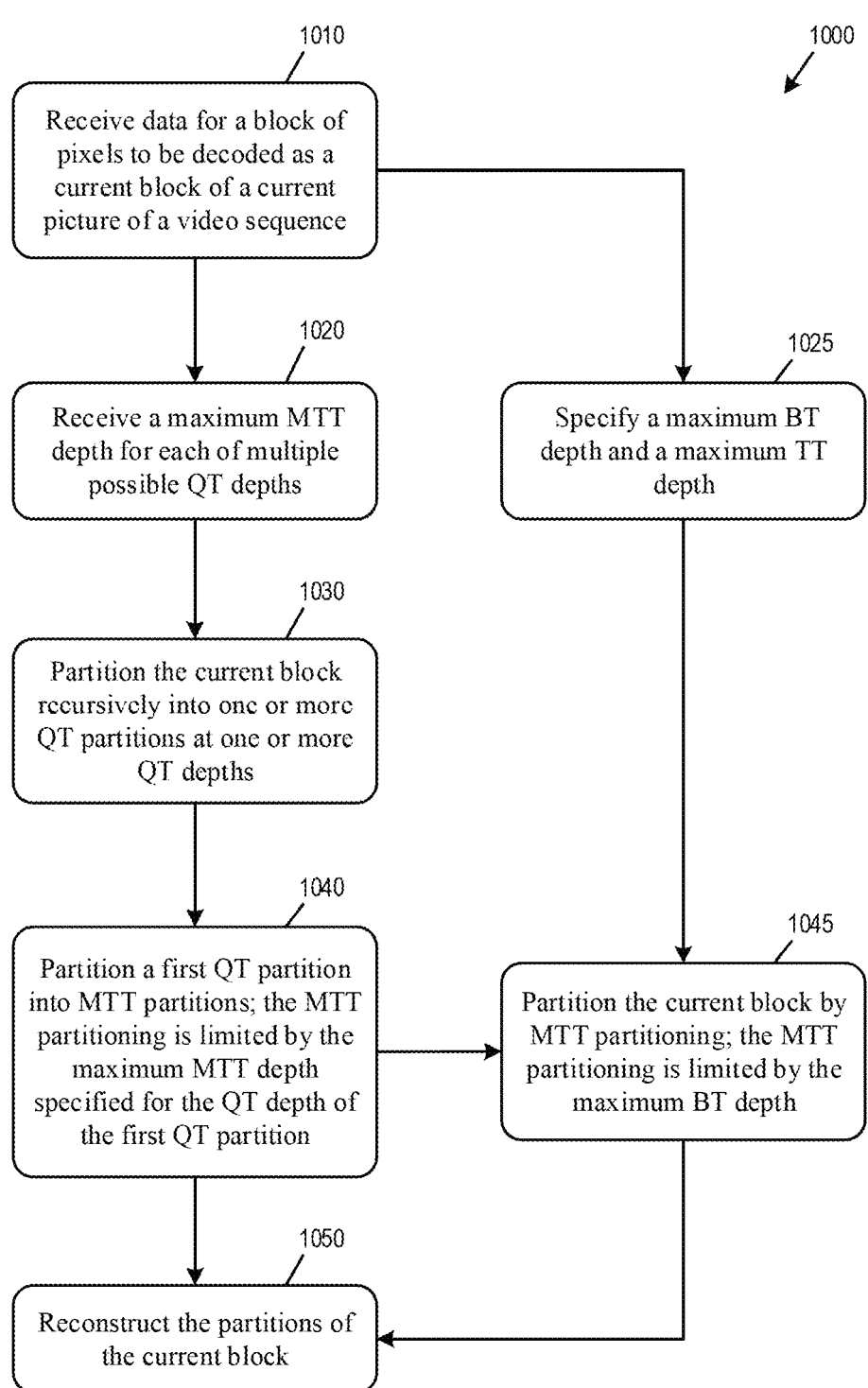
FIG. 10 conceptually illustrates a process for block partitioning based on maximum depths separately specified for different types of MTT partitioning and for different depth levels of QT partitioning.

FIG. 10 conceptually illustrates a process 1000 for block partitioning based on maximum depths separately specified for different types of MTT partitioning and for different depth levels of QT partitioning. In some embodiments, one or more processing units (e.g., a processor) of a computing device implementing the decoder 800 performs the process 1000 by executing instructions stored in a computer readable medium. In some embodiments, an electronic apparatus implementing the decoder 800 performs the process 1000.

The decoder receives (at block 1010) data to be decoded as a current block of pixels in a current picture of a video sequence. The decoder receives (at block 1020) a maximum multi-type tree (MTT) depth for each of a plurality of possible QT depths. The decoder may receive a syntax element indicating whether to apply the maximum MTT depths for the plurality of possible QT depths. The decoder may receive syntax elements specifying a maximum MTT depth for each of the multiple QT depths. In some embodiments, the maximum MTT depths for a luma component and maximum MTT depths for a chroma component are specified separately. In some embodiments, the decoder may also specify maximum MTT depths for binary tree (BT) partitioning and maximum MTT depths for ternary tree (TT) partitioning separately.

The syntax elements specifying the maximum MTT depths may be signaled in a picture header (PH) of the current picture, a sequence parameter set (SPS) of the video sequence, or a slice header of a current slice that includes the current block. In some embodiments, the maximum MTT depths for different QT depths are signaled in a lower-level syntax element (e.g., in a slice header or in a PH) by indicating that the maximum MTT depths are determined or derived from a higher-level syntax element (e.g., in a SPS). In some embodiments, the maximum MTT depths for different QT depths signaled in a lower-level syntax element may override MTT depths signaled in a higher-level syntax element. In some embodiments, the decoder may determine or derive the maximum MTT depth specified for a first QT depth from the maximum MTT depth specified for a second QT depth. The syntax elements related to signaling of the maximum MTT depths for different QT depths are also described by reference to Tables 1-2 above.

The decoder may also specify (at block 1025) a maximum binary tree (BT) depth and a maximum ternary tree (TT) depth. The decoder may receive syntax elements specifying the maximum BT depth and the maximum TT depth. The syntax elements related to signaling of the maximum BT and TT depths are also described by reference to Tables 3-4 above.

The decoder partitions (at block 1030) the current block by quadtree (QT) partitioning recursively into one or more QT partitions at one or more QT depths. The decoder may partition (at block 1040) a first QT partition by MTT partitioning into MTT partitions, the MTT partitioning being limited by the maximum MTT depth specified for the QT depth of the first QT partition. For example, when the first QT partition is at a first QT level, the MTT partitioning is limited by a first maximum MTT depth, and when the first QT partition is at a second QT level, the MTT partitioning is limited by a second maximum MTT depth.

The decoder may partition (at block 1045) the current block (or a partition thereof) by MTT partitioning, the MTT partitioning being limited by (i) the maximum BT depth when the MTT partitioning uses BT partitioning and (ii) the maximum TT depth when the MTT partitioning uses TT partitioning.

The decoder decodes (at block 1050) the current block by reconstructing the QT and MTT partitions of the current block. The decoder may then provide the reconstructed current block for display as part of the reconstructed current picture.

V. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 11:
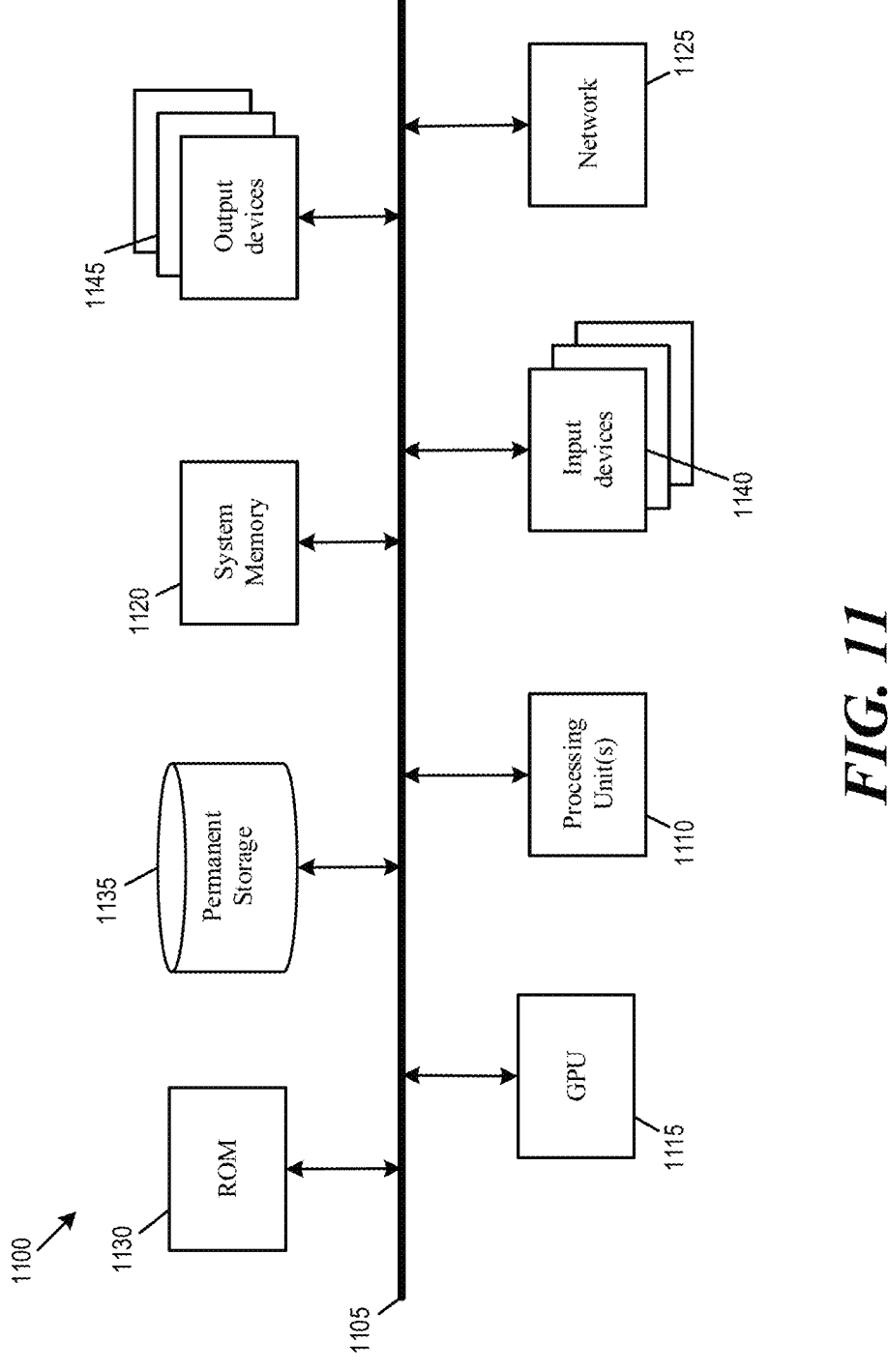
FIG. 11 conceptually illustrates an electronic system with which some embodiments of the present disclosure are implemented.

FIG. 11 conceptually illustrates an electronic system 1100 with which some embodiments of the present disclosure are implemented. The electronic system 1100 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1100 includes a bus 1105, processing unit(s) 1110, a graphics-processing unit (GPU) 1115, a system memory 1120, a network 1125, a read-only memory 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the GPU 1115, the read-only memory 1130, the system memory 1120, and the permanent storage device 1135.

From these various memory units, the processing unit(s) 1110 retrieves instructions to execute and data to process in order to execute the processes of the present disclosure. The processing unit(s) may be a single processor or a multi-core processor in different embodiments. Some instructions are passed to and executed by the GPU 1115. The GPU 1115 can offload various computations or complement the image processing provided by the processing unit(s) 1110.

The read-only-memory (ROM) 1130 stores static data and instructions that are used by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the present disclosure use a mass-storage device (such as a magnetic or optical disk and its corresponding disk drive) as the permanent storage device 1135.

Other embodiments use a removable storage device (such as a floppy disk, flash memory device, etc., and its corresponding disk drive) as the permanent storage device. Like the permanent storage device 1135, the system memory 1120 is a read-and-write memory device. However, unlike storage device 1135, the system memory 1120 is a volatile read-and-write memory, such a random access memory. The system memory 1120 stores some of the instructions and data that the processor uses at runtime. In some embodiments, processes in accordance with the present disclosure are stored in the system memory 1120, the permanent storage device 1135, and/or the read-only memory 1130. For example, the various memory units include instructions for processing multimedia clips in accordance with some embodiments. From these various memory units, the processing unit(s) 1110 retrieves instructions to execute and data to process in order to execute the processes of some embodiments.

The bus 1105 also connects to the input and output devices 1140 and 1145. The input devices 1140 enable the user to communicate information and select commands to the electronic system. The input devices 1140 include alphanumeric keyboards and pointing devices (also called "cursor control devices"), cameras (e.g., webcams), microphones or similar devices for receiving voice commands, etc. The output devices 1145 display images generated by the electronic system or otherwise output data. The output devices 1145 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 7 and FIG. 10) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:
   receiving data for a block of pixels to be encoded or decoded as a current block of a current picture of a video sequence;

determining a flag corresponding to a first condition or a second condition;

determining a maximum multi-type tree (MTT) depth for each of a plurality of possible quadtree (QT) partitioning depths or determining a maximum MTT depth for the current picture;

partitioning the current block by QT partitioning recursively into one or more QT partitions at one or more QT depths;

partitioning a first QT partition by MTT partitioning into MTT partitions, wherein the MTT partitioning is limited by the maximum MTT depth determined for the QT depth of the first QT partition when the flag corresponds to the first condition, and the MTT partitioning is limited by the maximum MTT depth determined for the current picture when the flag corresponds to the second condition; and reconstructing the QT and MTT partitions of the current block.

2. The video coding method of claim 1, wherein:

when the first QT partition is at a first QT level, the MTT partitioning is limited by a first maximum MTT depth; and when the first QT partition is at a second QT level, the MTT partitioning is limited by a second maximum MTT depth.

3. The video coding method of claim 1, wherein the maximum MTT depths for a luma component and maximum MTT depths for a chroma component are determined separately.

4. The video coding method of claim 1, wherein the maximum MTT depths for binary tree (BT) partitioning and maximum MTT depths for ternary tree (TT) partitioning are determined separately.

5. The video coding method of claim 1, wherein the maximum MTT depths for inter and intra slices are determined separately.

6. The video coding method of claim 1, further comprising signaling or receiving syntax elements specifying a maximum MTT depth for each of the multiple QT depths.

7. The video coding method of claim 6, wherein the syntax elements specifying the maximum MTT depths are signaled in a picture header of the current picture, a sequence parameter set of the video sequence, or a slice header of a current slice that includes the current block.

8. The video coding method of claim 6, wherein the maximum MTT depths are signaled in a lower-level syntax element by indicating that the maximum MTT depths are derived from a higher-level syntax element.

9. The video coding method of claim 6, wherein maximum MTT depths signaled in a lower-level syntax element override MTT depths signaled in a higher-level syntax element.

10. The video coding method of claim 1, further comprising signaling or receiving a syntax element indicating whether to allow to apply the different maximum MTT depths for the plurality of possible QT depths.

11. The video coding method of claim 1, further comprising deriving the maximum MTT depth specified for a first QT depth from the maximum MTT depth specified for a second QT depth.

12. An electronic apparatus comprising:

a video coder circuit configured to perform operations comprising:

receiving data for a block of pixels to be encoded or decoded as a current block of a current picture of a video sequence;

determining a flag corresponding to a first condition or a second condition;

determining a maximum multi-type tree (MTT) depth for each of a plurality of possible quadtree (QT) partitioning depths or determining a maximum MTT depth for the current picture;

partitioning the current block by QT partitioning recursively into one or more QT partitions at one or more QT depths;

partitioning a first QT partition by MTT partitioning into MTT partitions, wherein the MTT partitioning is limited by the maximum MTT depth determined for the QT depth of the first QT partition when the flag corresponds to the first condition, and the MTT partitioning is limited by the maximum MTT depth determined for the current picture when the flag corresponds to the second condition; and reconstructing the QT and MTT partitions of the current block.

13. A video decoding method comprising:

receiving data for a block of pixels to be decoded as a current block of a current picture of a video sequence;

determining a flag corresponding to a first condition or a second condition;

receiving a maximum multi-type tree (MTT) depth for each of a plurality of possible quadtree (QT) partitioning depths or determining a maximum MTT depth for the current picture;

partitioning the current block by QT partitioning recursively into one or more QT partitions at one or more QT depths;

partitioning a first QT partition by MTT partitioning into MTT partitions, wherein the MTT partitioning is limited by the maximum MTT depth received for the QT depth of the first QT partition when the flag corresponds to the first condition, and the MTT partitioning is limited by the maximum MTT depth determined for the current picture when the flag corresponds to the second condition; and reconstructing the QT and MTT partitions of the current block.

14. A video encoding method comprising:

receiving data for a block of pixels to be encoded as a current block of a current picture of a video sequence;

determining a flag corresponding to a first condition or a second condition;

specifying a maximum multi-type tree (MTT) depth for each of a plurality of possible quadtree (QT) partitioning depths or determining a maximum MTT depth for the current picture;

partitioning the current block by QT partitioning recursively into one or more QT partitions at one or more QT depths;

partitioning a first QT partition by MTT partitioning into MTT partitions, wherein the MTT partitioning is limited by the maximum MTT depth specified for the QT depth of the first QT partition when the flag corresponds to the first condition, and the MTT partitioning is limited by the maximum MTT depth determined for the current picture when the flag corresponds to the second condition; and encoding the QT and MTT partitions of the current block.

* * * * *